US008688967B2

(12) United States Patent
Smith et al.

(10) Patent No.: US 8,688,967 B2
(45) Date of Patent: Apr. 1, 2014

(54) SECURE BOOTING A COMPUTING DEVICE

(75) Inventors: Michael Smith, Sunnyvale, CA (US);
Joshua de Cesare, Campbell, CA (US);
Dallas Blake De Atley, San Francisco, CA (US); John Andrew Wright, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/558,249

(22) Filed: Jul. 25, 2012

(65) Prior Publication Data

US 2013/0024677 A1      Jan. 24, 2013

Related U.S. Application Data

(63) Continuation of application No. 11/620,689, filed on Jan. 7, 2007, now Pat. No. 8,254,568.

(51) Int. Cl.
*H04L 29/00* (2006.01)

(52) U.S. Cl.
USPC .................................. 713/2; 713/1

(58) Field of Classification Search
USPC .................................. 713/1, 2, 201
See application file for complete search history.

(56) References Cited

U.S. PATENT DOCUMENTS

| | | | |
|---|---|---|---|
| 4,975,950 A | 12/1990 | Lentz | |
| 5,121,345 A | 6/1992 | Lentz | |
| 5,713,024 A | 1/1998 | Halladay | |
| 5,991,399 A | 11/1999 | Graunke et al. | |
| 6,167,521 A | 12/2000 | Smith et al. | |
| 6,185,678 B1 | 2/2001 | Arbaugh et al. | |
| 6,188,602 B1 | 2/2001 | Alexander et al. | |
| 6,260,078 B1 | 7/2001 | Fowlow | |
| 6,263,431 B1 | 7/2001 | Lovelace et al. | |
| 6,330,670 B1 | 12/2001 | England et al. | |
| 6,370,249 B1 | 4/2002 | Van Oorschot | |
| 6,473,791 B1 | 10/2002 | Al-Ghosein et al. | |

(Continued)

FOREIGN PATENT DOCUMENTS

| | | |
|---|---|---|
| CN | 1553315 A | 12/2004 |
| EP | 0961193 A2 | 12/1999 |

(Continued)

OTHER PUBLICATIONS

PCT International Search Report and Written Opinion for PCT International Appln No. PCT/US2007/026279, mailed on Aug. 18, 2008 (12 pages).

(Continued)

*Primary Examiner* — Brandon Hoffman
*Assistant Examiner* — Michael D Anderson
(74) *Attorney, Agent, or Firm* — Womble Carlyle Sandridge & Rice, LLP

(57) ABSTRACT

A method and an apparatus for executing codes embedded inside a device to verify a code image loaded in a memory of the device are described. A code image may be executed after being verified as a trusted code image. The embedded codes may be stored in a secure ROM (read only memory) chip of the device. In one embodiment, the verification of the code image is based on a key stored within the secure ROM chip. The key may be unique to each device. Access to the key may be controlled by the associated secure ROM chip. The device may complete establishing an operating environment subsequent to executing the verified code image.

9 Claims, 12 Drawing Sheets

(56) References Cited

U.S. PATENT DOCUMENTS

| | | | |
|---|---|---|---|
| 6,587,947 B1 | 7/2003 | O'Donnell et al. | |
| 6,620,047 B1 | 9/2003 | Alcorn et al. | |
| 6,711,688 B1 | 3/2004 | Hubacher et al. | |
| 6,715,085 B2 * | 3/2004 | Foster et al. | 726/27 |
| 7,010,691 B2 | 3/2006 | Wheeler et al. | |
| 7,017,004 B1 | 3/2006 | Calligaro et al. | |
| 7,020,638 B1 | 3/2006 | Yacobi et al. | |
| 7,080,037 B2 | 7/2006 | Burger et al. | |
| 7,178,141 B2 | 2/2007 | Piazza | |
| 7,237,121 B2 | 6/2007 | Cammack et al. | |
| 7,383,442 B2 | 6/2008 | Schell et al. | |
| 7,500,272 B2 | 3/2009 | Wheeler et al. | |
| 7,624,444 B2 | 11/2009 | Gupta et al. | |
| 7,805,614 B2 | 9/2010 | Aull et al. | |
| 8,024,488 B2 | 9/2011 | Salowey et al. | |
| 8,055,913 B2 | 11/2011 | Ginter et al. | |
| 8,150,039 B2 | 4/2012 | De Cesare et al. | |
| 8,191,158 B2 | 5/2012 | Ginter et al. | |
| 2002/0002684 A1 | 1/2002 | Fox et al. | |
| 2002/0019985 A1 | 2/2002 | Fuccello et al. | |
| 2002/0048369 A1 | 4/2002 | Ginter et al. | |
| 2002/0133576 A1 | 9/2002 | Koymans et al. | |
| 2003/0056107 A1 | 3/2003 | Cammack et al. | |
| 2003/0059049 A1 | 3/2003 | Mihm, Jr. et al. | |
| 2003/0095096 A1 | 5/2003 | Robbin et al. | |
| 2003/0163702 A1 | 8/2003 | Vigue et al. | |
| 2004/0064457 A1 | 4/2004 | Zimmer et al. | |
| 2004/0092310 A1 | 5/2004 | Brosnan et al. | |
| 2004/0107349 A1 | 6/2004 | Sasselli et al. | |
| 2004/0224638 A1 | 11/2004 | Fadell et al. | |
| 2004/0243691 A1 | 12/2004 | Viavant et al. | |
| 2005/0005098 A1 | 1/2005 | Michaelis et al. | |
| 2005/0033969 A1 | 2/2005 | Kiiveri et al. | |
| 2005/0079868 A1 | 4/2005 | Shankar et al. | |
| 2005/0091501 A1 | 4/2005 | Osthoff et al. | |
| 2005/0132357 A1 | 6/2005 | Shell et al. | |
| 2005/0138409 A1 | 6/2005 | Sheriff et al. | |
| 2005/0144448 A1 | 6/2005 | England et al. | |
| 2005/0185067 A1 | 8/2005 | Estakhri et al. | |
| 2005/0228980 A1 | 10/2005 | Brokish et al. | |
| 2006/0064488 A1 | 3/2006 | Ebert | |
| 2006/0069692 A1 | 3/2006 | Pernia | |
| 2006/0090084 A1 | 4/2006 | Buer | |
| 2006/0137015 A1 | 6/2006 | Fahrny et al. | |
| 2006/0156007 A1 | 7/2006 | Stephens-Doll | |
| 2006/0174109 A1 | 8/2006 | Flynn | |
| 2006/0200859 A1 | 9/2006 | England et al. | |
| 2006/0236111 A1 | 10/2006 | Bodensjo et al. | |
| 2006/0259592 A1 | 11/2006 | Angeline | |
| 2006/0265733 A1 | 11/2006 | Chen et al. | |
| 2007/0136523 A1 | 6/2007 | Bonella et al. | |
| 2007/0136807 A1 | 6/2007 | DeLiberato et al. | |
| 2007/0253553 A1 | 11/2007 | Abdul Rahman | |
| 2007/0277037 A1 | 11/2007 | Langer | |
| 2008/0052769 A1 | 2/2008 | Leone et al. | |
| 2008/0082680 A1 | 4/2008 | Grewal et al. | |
| 2008/0170694 A1 | 7/2008 | Ryan et al. | |
| 2009/0290712 A1 | 11/2009 | Henry et al. | |
| 2010/0107220 A1 | 4/2010 | Nguyen | |
| 2010/0161879 A1 | 6/2010 | Nation et al. | |
| 2010/0287363 A1 | 11/2010 | Thorsen | |
| 2010/0293490 A1 | 11/2010 | Rousso et al. | |
| 2011/0004840 A1 | 1/2011 | Feinberg et al. | |

FOREIGN PATENT DOCUMENTS

| | | | |
|---|---|---|---|
| EP | 1085396 A1 | | 3/2001 |
| EP | 1217850 | | 6/2002 |
| EP | 1273996 | | 1/2003 |
| EP | 1369764 A2 | * | 12/2003 |
| EP | 1491983 A1 | | 12/2004 |
| EP | 1560098 | | 8/2005 |
| EP | 1659472 A1 | | 5/2006 |
| WO | WO0142889 | | 6/2001 |

OTHER PUBLICATIONS

PCT International Search Report and Written Opinion for PCT International Appln No. PCT/US2007/026277, mailed on Jul. 1, 2008 (11 pages).

PCT International Search Report and Written Opinion for PCT International Appln No. PCT/US2007/026006, mailed on Jun. 11, 2008 (13 pages).

PCT/US2009/040393, Int'l Search Report-Written Opinion (Jul. 27, 2009).

Microsoft, "Set up your hard disk for bitlocker drive encryption." http://windows.microsoft.com/en-US/windows7/set-up-your-hard-disk-for-bitlocker-drive encryption (Aug. 18, 2010).

Suzaki et al, "Trusted boot and platform trust services on 1CD Linux." Research Center for Information Security, Nat'l Inst. Adv. Ind. Sci. & Tech. (2008).

Ke et al., "Design of boot loader with multiple communication port." 2008 Intl. Conf. Computer Sci. & Software Engr. (pp. 169-175).

Singh et al., "Optimizing the boot time of android on embedded system." 2011 IEEE 15th Int'l. Symposium on Consumer Electronics. (pp. 503-508).

Fuji et al., "A fast-boot method for embedded mobile Linux: toward a single-digit user sensed boot time for full-featured commercial phones." 2011 Workshops of Int'l Conf. on Adv. Inf. Networking & Applications (pp. 81-85).

PCT/US2009/051766, Int'l. Search Report—Written Opinion (Nov. 9, 2009).

EP09166473. Search Report (Oct. 29, 2009).

* cited by examiner

SECURE BOOTING A COMPUTING DEVICE

This application is a continuation of application Ser. No. 11/620,689, filed on Jan. 7, 2007 now U.S. Pat. No. 8,254,568.

FIELD OF THE INVENTION

The present invention relates generally to electronic security. More particularly, this invention relates to booting a computing device securely.

BACKGROUND

As more and more computing devices are being used in people's daily life, security has become a widespread concern for users and content providers. Viruses, worms, Trojan horses, identity theft, software and media content piracy, and extortion using threats of data destruction are rampant. Usually, these attacks involve installing and executing malicious software codes to expose access to device resources that would otherwise be private to the system, the content provider, the user or an application.

For example, a hacker program when running in consumer computing devices developed to play audio/video content, such as Hollywood movies or music, could potentially allow the cracking of the encryption used to secure the A/V content. Therefore, high levels of security are usually required for such devices.

An operating system may provide some security features to guard against such attacks. However, the security features of an operating system often fail to keep up with new attacks occurring on a daily basis. Moreover, when booting a computing device, security features may not yet be initialized and are vulnerable to bypass and/or tampering.

Another way to guard against these attacks is to completely seal a computing device from installing and/or running any additional software after shipped out from manufacturers. Such a strict measure, however, severely limits the capabilities and the flexibilities of the underlying computing device. Not only does it make upgrading a computing device costly and difficult, it is not able to take advantage of increasing number of applications which do require downloading and running software codes from outside the device. In addition, the rapid technology advancement usually renders the applications or functionalities originally built inside a computing device obsolete within a very short period of time.

Therefore, current security measures do not deliver a robust solution to protect applications and content inside a computing device, while at the same time providing the flexibility to update the software and or firmware for the device.

SUMMARY OF THE DESCRIPTION

A method and apparatus for executing codes embedded inside a device to verify a code image loaded in a memory of the device are described herein. A code image may be executed after being verified to be a trusted code image. The embedded codes may be stored in a secure storage area such as a ROM (read only memory) of the device. In one embodiment, the verification of the code image is based on a key stored within the secure storage area. The key may be unique to each device. Access to the key may be controlled by the associated secure storage area. The device may complete establishing an operating environment subsequent to executing the verified code image.

In an alternative embodiment, the code image may represent a kernel of an operating system (OS) that provides an operating environment of a device. The code image may be loaded from a mass storage of the device. Upon being successfully verified using a key stored within the secure ROM and the key uniquely identifying the device, the code image may be executed in a main memory of the device to set up the kernel of the OS in order to establish the operating environment of the device. In one embodiment, the device is a portable device.

In an alternative embodiment, a first executable image embedded from a secure ROM (read-only memory) of a device may be executed to initialize a mass storage device associated with the device to enable the mass storage device to be accessed. The secure ROM may have stored therein a unique identifier (ID) uniquely identifying the device. Upon successfully initializing the mass storage device, a second executable image stored within the mass storage device may be located and verified using the unique identifier (ID) embedded within the secure ROM. After being successfully verified, the second executable image may be executed to perform low level hardware initialization on the device. The second executable image may be successfully executed to locate and execute a third executable image to verify and load a kernel image of an operating system (OS) for the device. The kernel image may be successfully executed to initialize and configure a remainder of the OS for the device.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
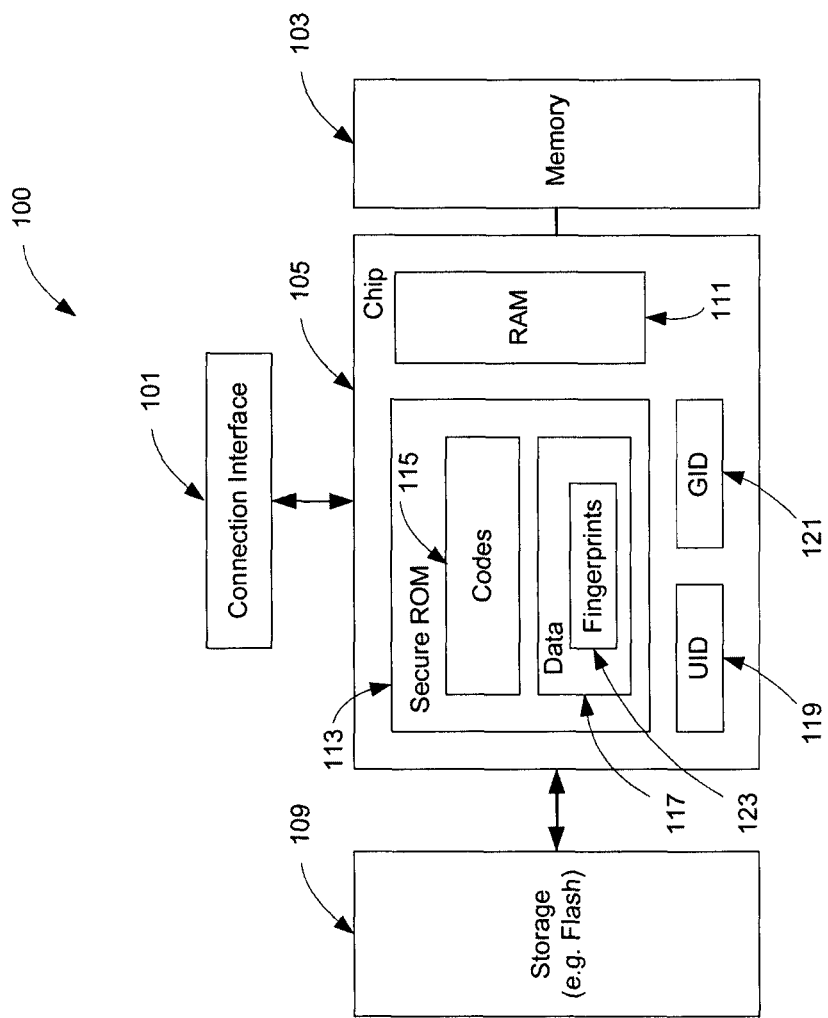
FIG. 1 is a block diagram illustrating one embodiment of system components for secure booting.

A method and an apparatus for secure booting of a computing device are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The term "host" and the term "device" are intended to refer generally to data processing systems rather than specifically to a particular form factor for the host versus a form factor for the device.

In one embodiment, secure booting a device may be designed to ensure critical resources within the device will be protected in an operating environment. In the mean time, secure booting a device may provide a flexibility to allow software running inside the device to be updated and installed under different policies and procedures without requiring unnecessary management, material and/or performance costs. In one embodiment, the security of booting a device may be performed by the code and data stored inside a secure storage area such as a ROM (Read Only Memory), also referred to as a secure ROM, integrated together within the device. The content of a secure ROM may be stored during a manufacturing stage of the device. The secure ROM may be associated with a UID (Unique Identifier) of the device, which uniquely identifies the device. A trust of a software code running in the device may be rooted from a code image signed through the secure ROM based on the UID.

According to one embodiment, the secure ROM of a device may include a fingerprint of a root certificate of a trusted entity. A code image certified through the trusted entity may be trusted to be executed in the device according to a certification process via the secure ROM based on the fingerprint. In one embodiment, secure booting the device may recover trusted software codes when coupled with the trusted entity according to the secure ROM. The secure ROM may extend a trust to a code image certified through the fingerprint based on the device UID stored. In one embodiment, the secure ROM may allow application software restoration by certifying a code image downloaded from an external connection. In another embodiment, the secure ROM may force cleaning up user data stored inside the device by a trusted software code downloaded through external connection.

FIG. 1 is a block diagram illustrating one embodiment of system components for secure booting. System 100 may reside in one or more chips inside a device. In one embodiment, system 100 may include a chip 105 coupled with a memory component 103. Chip 105 may also include a RAM (Random Access Memory) component 111, such as an SRAM (Static Random Access Memory) or an EDRAM (Embedded Dynamic Random Access Memory). A code image may be loaded into the memory component 103 prior to being executed by the device. When executed, a code image may enable a user application, a system application, and/or an operating environment (e.g. operating system) for the device that supports the user or system application. In one embodiment, memory component 103 includes DDR (Double Data Rate) memory. Chip 105 may include a ROM 113 storing codes 115 and associated data 117. Codes 115 may include implementation of SHA (Secure Hashing Algorithm) hashing functions such as cryptographic hash functions SHA-1, SHA-224, SHA-256, SHA-384, and SHA-512. Additionally, codes 115 may include implementations of data encrypting algorithms such as AES (Advanced Encryption Stantdard) encryption. In one embodiement, codes 115 may cause hardware initialization for the device to support a connection or communication interface such as USB (Universal Serial Bus). Codes 115 may include instructions to change the clock rate of the device. Note that throughout this application, SHA and AES are utilized as examples for the illustration purposes only; it will be appreciated that other hashing and/or encryption techniques may also be utilized.

In one embodiment, codes 115 may cause loading a code image into a device memory such as memory component 103 or RAM 111. A code image may be loaded from a storage component 109 coupled with the chip 105. The storage component 109 may be a flash memory, such as a NAND flash, a NOR flash, or other mass storage (e.g., hard disk) components. In another embodiment, a code image may be loaded though a connection interface 101 from a source external to the device. The connection interface 101 may be based on a USB connection, an Ethernet connection, or a wireless network connection (e.g., IEEE 802.1x), etc. In one embodiment, codes 115 may cause storing a code image from a device memory into the storage component 109 after verifying the code image includes only trusted codes.

Before the device may start executing the code image loaded in the device memory, codes 115 may perform verification operations on the loaded code image to ensure the code image could be trusted. In one embodiment, codes 115 may verify a loaded code image according to data included in the chip 105, such as the data section 117 inside the ROM, a UID 119 and/or a GID (Global Identifier) 121. UIDs 119 may be unique for each device. In one embodiment, all devices are associated with a single GID 121. In one embodiment, a GID may be used to encrypt a code image to prevent code inspection. Data section 117 of the ROM 115 may store a fingerprint 123 based on a signature from a trusted entity such as a public key certificate. In one embodiment, separate devices may include fingerprints 123 based on the same trusted entity.

Figure 2:
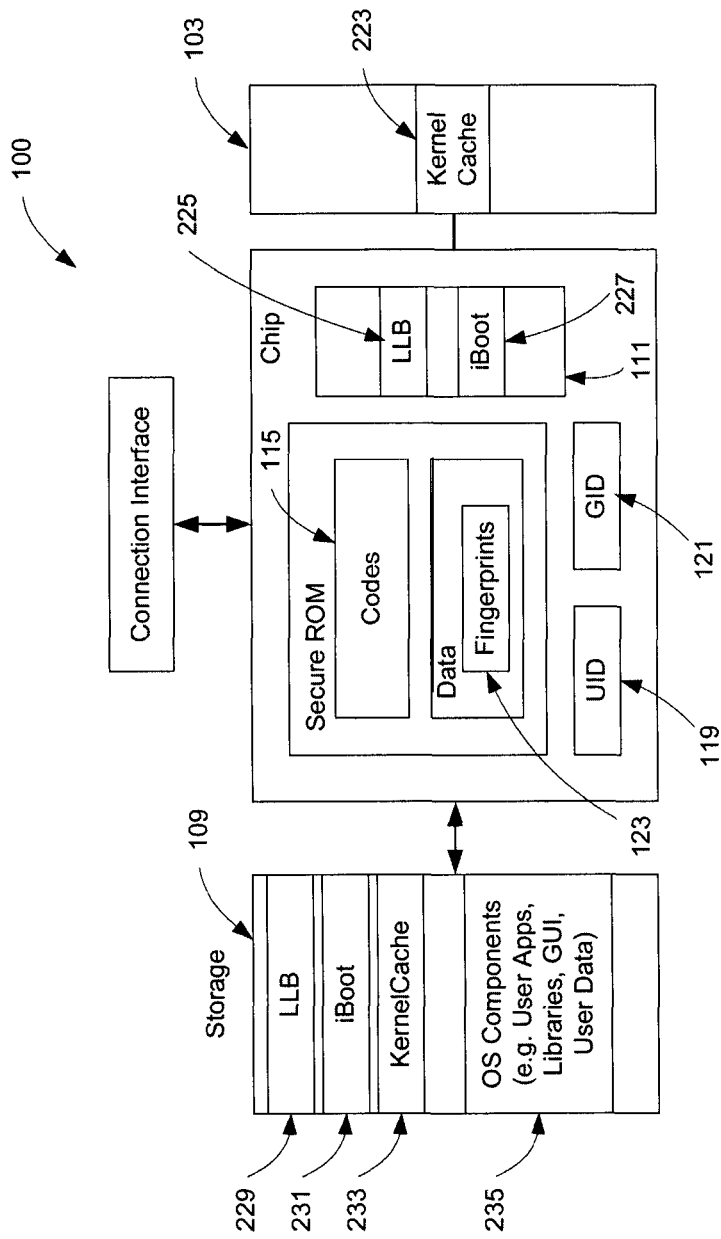
FIG. 2 is a block diagram illustrating one embodiment of system components executing secure booting.

FIG. 2 is a block diagram illustrating one embodiment of system components executing secure booting. System 100 may load an LLB (Low Level Boot) code image 229 from storage component 109 into RAM 111 as LLB 225. LLB 225 may be related to long term power management of the system 100. In one embodiment, LLB 225 may include an identification of the version of system 100. Code image LLB 225 may be loaded based on execution of codes 115. In one embodiment, code image LLB 229 may be stored from RAM 111 based on code image LLB 225 via execution of codes 115.

Code image iBoot 227, according to one embodiment, may be loaded into memory component 111 from storage 109 based on code image iBoot 231 according to execution of LLB 225. Code image iBoot 231 may cause hardware initialization for an operating system that provides an operating environment for the device housing system 100. A device may enter an operating environment after a successful booting. An operating environment may support various user and/or system applications running in the device. In one embodiment, code image iBoot 231 may enable mass storage components of the device, initialize graphic components for user interface, and/or activate screen components for the device, etc. Code image iBoot 231 may be stored from RAM 111 based on code image iBoot 227 via execution of code image LLB 225.

In one embodiment, code image Kernelcache 223 may be loaded from storage 109 to memory 103 based on code image Kernelcache 233. Code image Kernelcache 223 may be part of the kernel of an operating system to support the operating environment for the device. In one embodiment, code image Kernelcache 223 causes a kernel and operating system components 235 to be loaded into memory 103 from storage 109. Operating system components may include user applications, libraries, graphic user interface components, and/or user data 235. User data may include music, images, videos or other digital content associated with a user of the device. For example, such user data may be DRM (digital rights management) compliant data having restricted usages. Code image Kernelcache 223 may enable loading the kernel and the operating system components 235 into memory 103. In one embodiment, code image Kernelcache 223 may cause a verification process to ensure the kernel is trusted before being executed in memory 103. In another embodiment, code image Kernelcache 223 may cause a verification process to ensure an operating system component 235 is trusted before being executed in memory 103. Code image Kernelcache 223 may be executed to determine an operating system component 235 is trusted based on UID 119 or fingerprints 123. In one embodiment, code image Kernelcache 223 may cause decryption of an operation system component 235 in memory 103 according to GID 121. In one embodiment, code image Kernelcache 223 may be executed to store operating system components 235 from memory 103 into storage 109. Code image Kernelcache 223 may enable encrypting operating system components 235 before being stored in the storage 109.

In one embodiment, UID 119 may be accessible to some operating system components running in a privileged mode. The kernel of the operating system may deny or approve an application to access UID 119 by an application depending on whether the application is running in a privileged mode. In one embodiment, the kernel of the operating system may determine whether an application can be run in a privileged mode based on whether the corresponding code image of the application includes a properly signed signature. A DRM (Digital Right Management) system may be running in a privileged mode to control access to user data of the operating system components 235 based on UID 119. An application may access user data through a DRM system. In some embodiments, network utilities of the operation system may be privileged. Network utilities may enable the device to interconnect with outside resources though an interface chip, such as base band chip. In another embodiment, virus protection software may be provided by the operating system to run in a privileged mode.

Thus, any software components that will be running within the system must be verified or authenticated prior to the execution, unless the software components satisfy certain predetermined conditions (e.g., provided by a trust vendor or during certain circumstances such as manufacturing of the device or testing of the software components). In one embodiment, the settings of a secure storage area in the system may be associated with a predetermined condition. As a result, any data such as DRM compliant data would not be accessed or compromised without proper verification or authentication.

Figure 3:
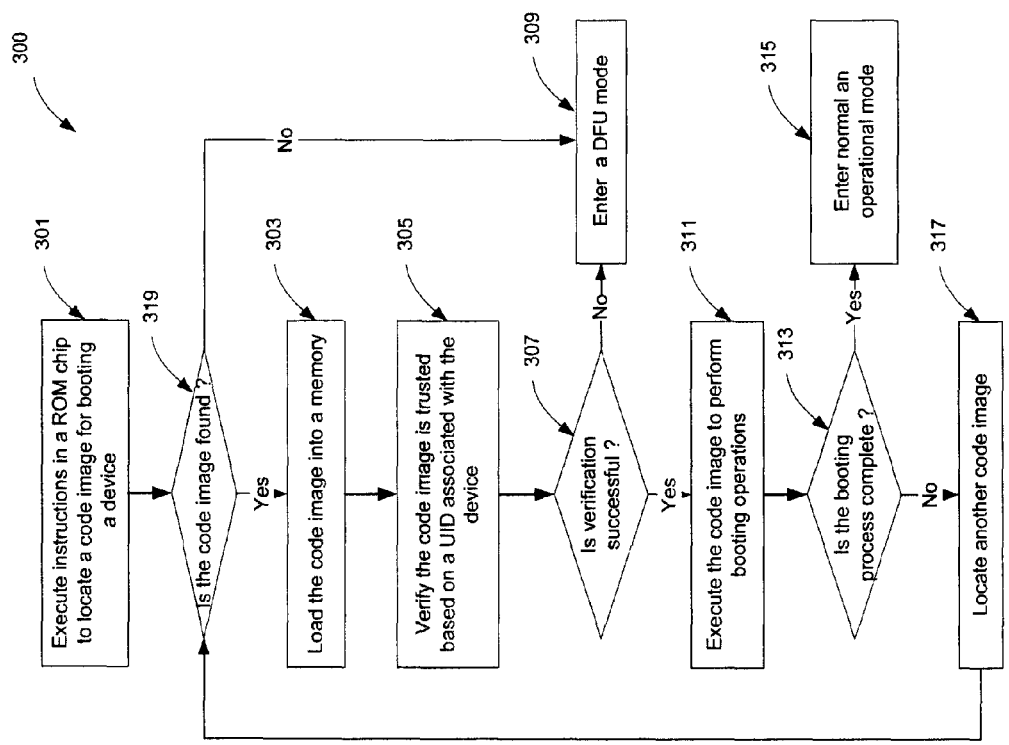
FIG. 3 is a flow diagram illustrating one embodiment of a process to perform secure booting.

FIG. 3 is a flow diagram illustrating one embodiment of a process to perform secure booting. For example, process 300 may be performed by system 100 of FIG. 1. During a booting process of a device, according to one embodiment, the processing logic of process 300 may locate a code image from within the device by executing instructions in a ROM chip at block 301. The instructions may be read from a code section of the ROM chip as in codes 115 of FIG. 1. The code image may be stored in a memory component or a storage component of the device. A memory component may be a RAM. A storage component may be a flash memory or a mass storage device attached to the device. In one embodiment, if the code image could not be located, the booting process may be interrupted and the device may enter a DFU (Device Firmware Upgrade) mode at block 309. If the code image is located successfully, according to one embodiment, the processing logic of process 300 may load the code image into a memory at block 303. In another embodiment, the code image may already been loaded in the memory when located.

At block 305, according to one embodiment, the processing logic of process 300 may verify whether the loaded code image could be trusted based on a UID associated with the device such as UID 119 of FIG. 1. The processing logic of process 300 may extract a header value from the code image. The location of the header value inside the code image may be predetermined. In one embodiment, the header value may be extracted based on a preset attribute in an attribute value pair inside the code image. The header value may include a signature value signed over the code image according to the UID of the device through well-known hashing and encryption algorithms. In one embodiment, the processing logic of process 300 derives another signature value from the code image according to the UID through the same well-known hashing and encryption algorithms at block 305. The processing logic of process 300 may compare the derived signature value and the extracted signature value to verify whether the code image is trusted. In one embodiment, the verification may be successful if the derived signature value and the extracted signature match with each other. Otherwise, the verification may fail. If the verification is not successful, the processing logic of process 300 may cause the device to enter a DFU mode at block 309. In one embodiment, the processing logic of process 300 may remove the code image from the memory before the device enters the DFU mode at block 309.

If the verification is successful, the processing logic of process 300 may execute the code image at block 311. In one embodiment, the code image may be an LLB, an iBoot or a Kernelcache as shown in 225, 227 and 223 in FIG. 2. The processing logic of process 300 may perform booting operations for the device at block 311. Booting operations may include product identifications, starting device power management, enabling mass storage components, initializing graphic components for user interface, activating screen components and/or device hardware initialization, etc. In one embodiment, booting operations may include loading an operating system to the memory including a kernel and certain operating system components such as shown in 235 of FIG. 2. The processing logic of process 300 may attach a trust indicator to a trusted code image in the memory to indicate a successful verification. In one embodiment, a code image associated with a trust indicator located in a memory may be executed as a trusted code without verification. At block 313, the processing logic of process 300 may determine if the device is completely booted. If the device is completed booted, the device may become operational and enter a normal operational mode at block 315. In one embodiment, a Kernelcache 227 may start a user application running in a user mode after the device enters a normal operation. An application running in a user mode may not access device hardware related information such as UID 119 and GID 121 of FIG. 2. The device may enter a DFU mode if a booting operation fails at block 313.

At block 317, according to one embodiment, the booting process may continue when the processing logic of process 300 determines the device booting process is not complete at block 313. The processing logic of process 300 may locate another code image at block 313 based on executing the current code image. In one embodiment, executing code image LLB may locate code image iBoot as shown in FIG. 2. In another embodiment, executing code image iBoot may locate code image Kernelcache as shown in FIG. 2. In some embodiments, executing code image Kernelcache may locate code images including the kernel and operating system components as shown in FIG. 2. The processing logic of process 300 may loop back to block 319 to proceed on the booting process according to the result of locating the next code image at block 317.

Figure 4:
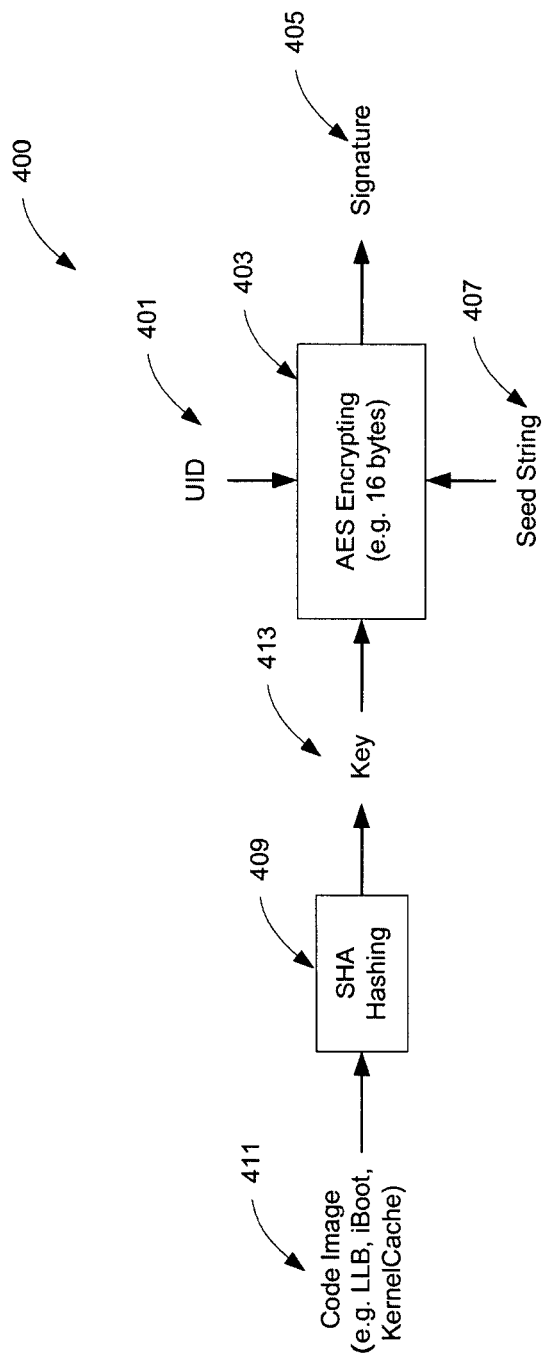
FIG. 4 is a flow diagram illustrating one embodiment of a process to generate a signature from a code image based on an UID (Unique Identifier) and a seed string.

FIG. 4 is a flow diagram illustrating one embodiment of a process to generate a signature from a code image based on an UID and a seed string. For example, process 400 may be performed by a system as shown in FIG. 1. In one embodiment, the processing logic of process 400 performs a hashing operation 409 over a code image 411, such as LLB 225, iBoot 227 or Kernelcache 223 shown in FIG. 2. The hashing operation may be based on SHA (Secure Hash Algorithm) hashing functions such as cryptographic hash functions SHA-1, SHA-224, SHA-256, SHA-384, and SHA-512. In one embodiment, hashing operation 409 may produce a key string 413. Key string 413 may have a length of 20 bytes. In one embodiment, the processing logic of process 400 may perform an encrypting operation at block 403 to generate a signature 405 based on key string 413, UID 401 and seed string 407 associated with a device. In one embodiment, the encrypting operation may be based on an AES (Advanced Encryption Standard) algorithm at block 403. The processing logic of process 400 may truncate key string 413 at block 403, such as discarding 4 out of 20 bytes of key string 413. In one embodiment, the AES algorithm at block 403 is based on 16 bytes. UID 401 may be stored within the device as UID 119 shown in FIG. 1. Seed string 407 may be generated through a seed generating function based on the device. In one embodiment, seed string 407 may be the same each time the seed generating function is applied for the same device.

Figure 5:
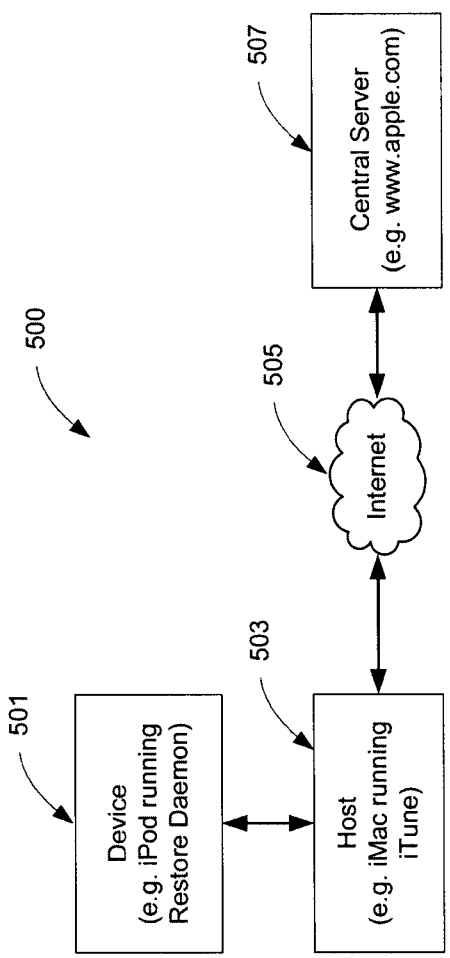
FIG. 5 is a block diagram illustrating one embodiment of network connections for a host to securely boot a device.

FIG. 5 is a block diagram illustrating one embodiment of network connections for a host to securely boot a device according to the system of FIG. 1. In one embodiment, a device may enter a DFU mode for booting by connecting to a host. A device may be forced to enter a DFU mode based on an initiation from froon user. In one embodiment, a device may enter a DFU mode in response to a user performing a predetermined action such as pressing a button of the device. A user may request a device to enter a DFU mode for performing system management tasks for the device, including, for example, cleaning up user data, upgrading hardware drivers, upgrading user applications, and/or installing new applications, etc. A device may automatically enter a DFU mode when the device fails to boot in at least one stage of the booting sequence, such as shown at block 309 of FIG. 3. Alternatively, a device may enter a DFU mode when the operating system encounters an abnormality during normal operation such as when a corrupted data or damaged software components are detected.

According to one embodiment, network 500 may include a device 501 coupled with a host 503. Device 501 may be a media player such as, for example, an iPod from Apple Computer Inc. running restoring daemon application to restore operating system components from the coupled host 503. Device 501 may be coupled with host 503 through a connection interface supporting TCP/IP protocols. The connection interface may be based on USB, a wireless network or an Ethernet, etc. In one embodiment, host 503 may be a Mac or Windows based computer running application software such as, for example, an iTune application from Apple Computer Inc. Host 503 may be connected to a central server 507 through the network 505 such as wide area network (e.g., Internet) or local area network (e.g., Intranet or peer-to-peer network). In one embodiment, central server 507 may be based on a publicly accessible web server. Alternatively, server 507 may be an Intranet or local server.

Figure 6:
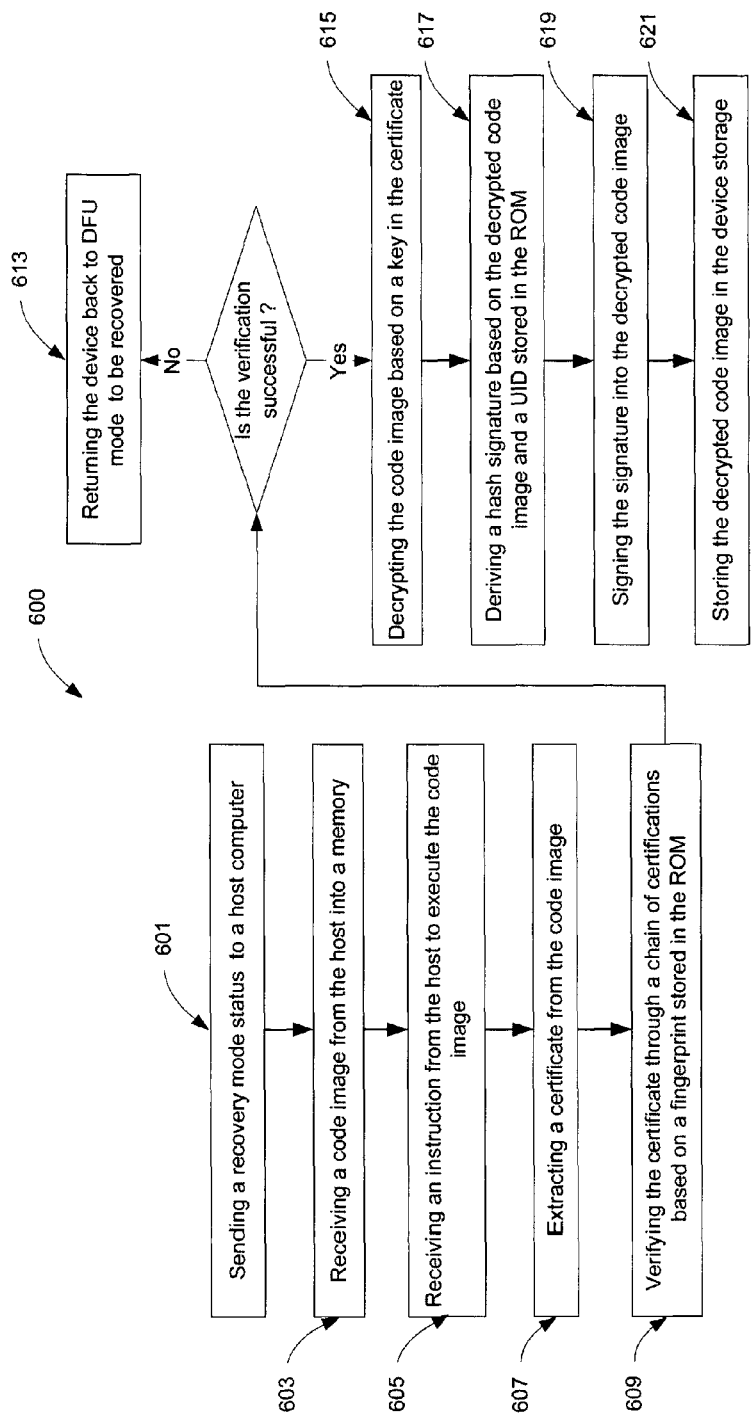
FIG. 6 is a flow diagram illustrating an embodiment of a process to securely recover an operating environment from a host to a device.

FIG. 6 is a flow diagam illustrating an embodiment of a process to securely recover an operating environment from a host to a device. For example, process 600 may be performed by systems as shown in FIGS. 1 and/or 5. In one embodiment, the processing logic of process 600 may send a status to a host computer indicating a device being in a recovery mode at block 601. The device may enter the recovery mode in response to a failure to verify a code image. The host computer may be coupled to a device performing process 600 as shown in FIG. 5. In one embodiment, the status may include a product ID and/or a vendor ID. The host computer may prepare a code image to recover the connected device based on the received status. In one embodiment, the code image may be retrieved from a central server computer by the host computer connected over a network such as network 505 as shown in FIG. 5. At block 603, according to one embodiment, the processing logic of process 600 may receive the code image from the host computer into a memory component of a device, such as memory 103 as shown in FIG. 1. The processing logic of process 600 may receive an instruction from the host computer to execute the received code image at block 605. In one embodiment, process 600 may be controlled by recovery software running on the host computer, such as iTune running in a MAC based computer.

According to one embodiment, at block 607, the processing logic of process 600 may extract a certificate accompanying the code image received in the memory of the device. The code image may be a LLB, an iBoot and/or a Kernelcache as shown in FIG. 2. The code image may be encrypted according to public key cryptography such as RSA (Ralph Shamir Adelman) public key cryptography. The certificate may include a key based on X.509 standard. At block 609, the processing logic of process 600 may verify the certificate according to the code stored in a secure ROM of the device such as code 115 shown in FIG. 1. In one embodiment, the processing logic of process 600 may certify a chain of certificates to verify the extracted certificate with a root certificate as the last certificate in the chain. The processing logic of process 600 may retrieve certificates from the connected host computer. In one embodiment, the root certificate may be verified based on the fingerprint stored in a secure ROM of the device, such as fingerprint 123 as shown in FIG. 1. The root certificate may be issued by Apple Computer Inc. If the verification fails, the processing logic of process 600 may return the device back to DFU mode to be recovered at block 613.

If the certificate from the code image is successfully verified, the processing logic of process 600 may continue the recovery process at block 615 to decrypt the code image based on the key included in the verified certificate. At block 617, the processing logic of process 600 may derive a hash signature from the code image based on a UID stored in a secure ROM of the device, such as UID 119 as shown in FIG. 1. In one embodiment, the hash signature may be obtained, for example, according to the process as shown in FIG. 4. At block 619, the processing logic of process 600 may sign the derived signature into the code image. In one embodiment, the derived signature may be signed as a header value of the code image. The processing logic of process 600 may store the signed code image into a storage of the device at block 621, such as, for example, storage 109 shown in FIG. 1. In one embodiment, a signed code image may be stored to repair another code image failed to be verified in the device. In one embodiment, the code image may be executed before being stored into a storage of the device. In another embodiment, the code image may be stored into the storage of the device after being successfully executed.

Figure 7:
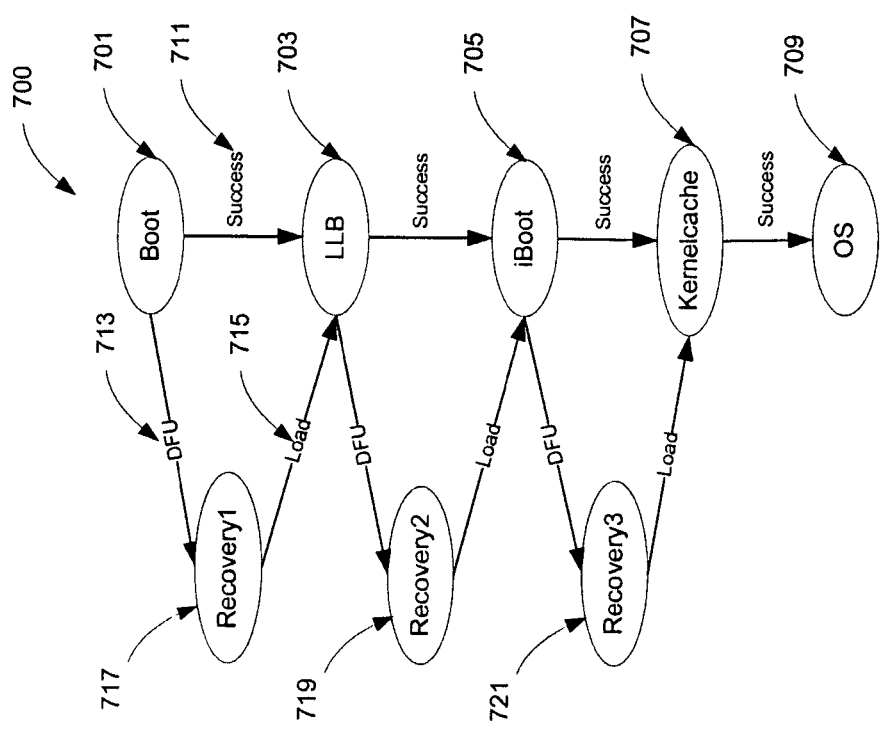
FIG. 7 is a state diagram illustrating an embodiment of a process to perform minimum secure recovery of an operating environment from a host to a device.

FIG. 7 is a state diagram illustrating an embodiment of a process to perform secure recovery of an operating environment from a host to a device. For example, states 700 may represent certain operating states of systems as shown in FIGS. 1 and/or 5. In one embodiment, a device may enter an initial state Boot 701 to start a boot process. Instructions stored in a secure ROM of the device may be executed during state Boot 701. In one embodiment, during state Boot 701, a low level boot program such as LLB 229 shown in FIG. 2 may be located within the device. The low level boot program may be located and loaded into a memory component of the device. In one embodiment, the located low level boot program may be verified to be a trusted code image according to a process such as described at block 305 of FIG. 3. If the low level boot program is successfully located and verified, state 700 may enter state LLB 703 from state Boot 701 according to transition Success 711. Otherwise, according to one embodiment, state 700 may enter state Recovery1 717 through transition DFU 713 as the device enters a DFU mode.

During state Recover1 717, the device may be coupled with a host computer to perform a recovery process such as shown in FIG. 5. In one embodiment, the device may publish a status based on state Recovery1 717. The host computer may send a code image corresponding to the status received from the device. In one embodiment, the code image may be an LLB 229 as shown in FIG. 2. The device may perform a chain of certifications to verify the received code image is trusted based on a UID and a fingerprint stored inside a secure ROM of the device such as UID 119 and fingerprints 123 of FIG. 1. The chain of certifications may be performed based on a process similar to process 600 at block 609 in FIG. 6. If the code image is successfully loaded and verified, in one embodiment, the state of the device may be transitioned from state Recovery1 717 to state LLB 703 through transition Load 715.

In one embodiment, during state LLB 701, the device may execute the verified low level boot program (e.g., LLB or low level library as described above) to locate another boot image such as iBoot 231 shown in FIG. 2 within the device. The boot image may be located and loaded into a memory component of the device during state LLB 701. In one embodiment, the boot image may be verified to be a trusted code image according to a process such as described at block 305 of FIG. 3. If the boot image is successfully located and verified, state 700 may enter state iBoot 705 from state LLB 703. Otherwise, according to one embodiment, state 700 may enter state Recovery2 719 as the device enters a DFU mode.

During state Recover2 719, the device may be coupled with a host computer to perform a recovery process such as shown in FIG. 5. In one embodiment, the device may publish a status based on state Recovery2 719. The host computer may send a code image corresponding to the status received from the device at state Reovery2 719. In one embodiment, the code image may be an iBoot 231 as shown in FIG. 2. The device may perform a chain of certifications to verify the received code image is trusted based on a UID and a fingerprint stored inside a secure ROM of the device such as UID 119 and fingerprints 123 of FIG. 1. The chain of certifications may be performed based on a process similar to process 600 at block 609 in FIG. 6. If the code image is successfully loaded and verified, in one embodiment, the state of the device may be transitioned from state Recovery2 719 to state Kernelcache 707.

During state iBoot 705, according to one embodiment, the device may execute the verified boot program to locate a kernel image such as Kernelcache 233 shown in FIG. 2 within the device. The kernel image may be located and loaded into a memory component of the device during state iBoot 705. In one embodiment, the kernel image may be verified to be a trusted code image according to a process such as described at block 305 of FIG. 3. If the kernel image is successfully located and verified, state 700 may enter state Kernelcache 707 from state iBoot 705. Otherwise, according to one embodiment, state 700 may enter state Recovery3 721 as the device enters a DFU mode.

During state Recover3 721, the device may be coupled with a host computer to perform a recovery process such as shown in FIG. 5. In one embodiment, the device may publish a status based on state Recovery3 721. The host computer may send a code image corresponding to the status received from the device at state Reovery3 721. In one embodiment, the code image may be a kernel image such as Kernelcache 233 of FIG. 2. The device may perform a chain of certifications to verify the received code image is trusted based on a UID and a fingerprint stored inside a secure ROM of the device such as UID 119 and fingerprints 123 of FIG. 1. The chain of certifications may be performed based on a process similar to process 600 at block 609 in FIG. 6. If the code image is successfully loaded and verified, in one embodiment, the state of the device may be transitioned from state Recovery3 721 to state Kernelcache 707.

In one embodiment, during state Kernelcache 707, the device may execute a verified kernel image to locate operating system components such as 235 in FIG. 2. A located operating system component may be loaded into a memory component of the device to be verified as trusted according to the execution of the verified kernel image during state Kernelcache 707. In one embodiment, the kernel image may determine whether an operating system component is trusted according to a process such as described at block 305 of FIG. 3. A privileged mode may be assigned to a trusted operating system component based on the kernel image for accessing hardware level interface of the device, such as UID 119 or GID 123 of FIG. 2. An operating system component without a signed signature may be assigned a user mode privilege during state Kernelcache 707. In one embodiment, an operating system component may not be permitted to access hardware level interface of the device. After the operation system is successfully loaded in to the memory of the device, state 700 may transition from state Kernelcache 707 to state OS 709 corresponding to a normal operating environment. A user application may start running in assigned user mode during state OS 709. In one embodiment, a device at state Kernelcache 707 may enter a DFU mode to receive a root image from a coupled host computer to restore or update operating system components for the device.

Figure 8:
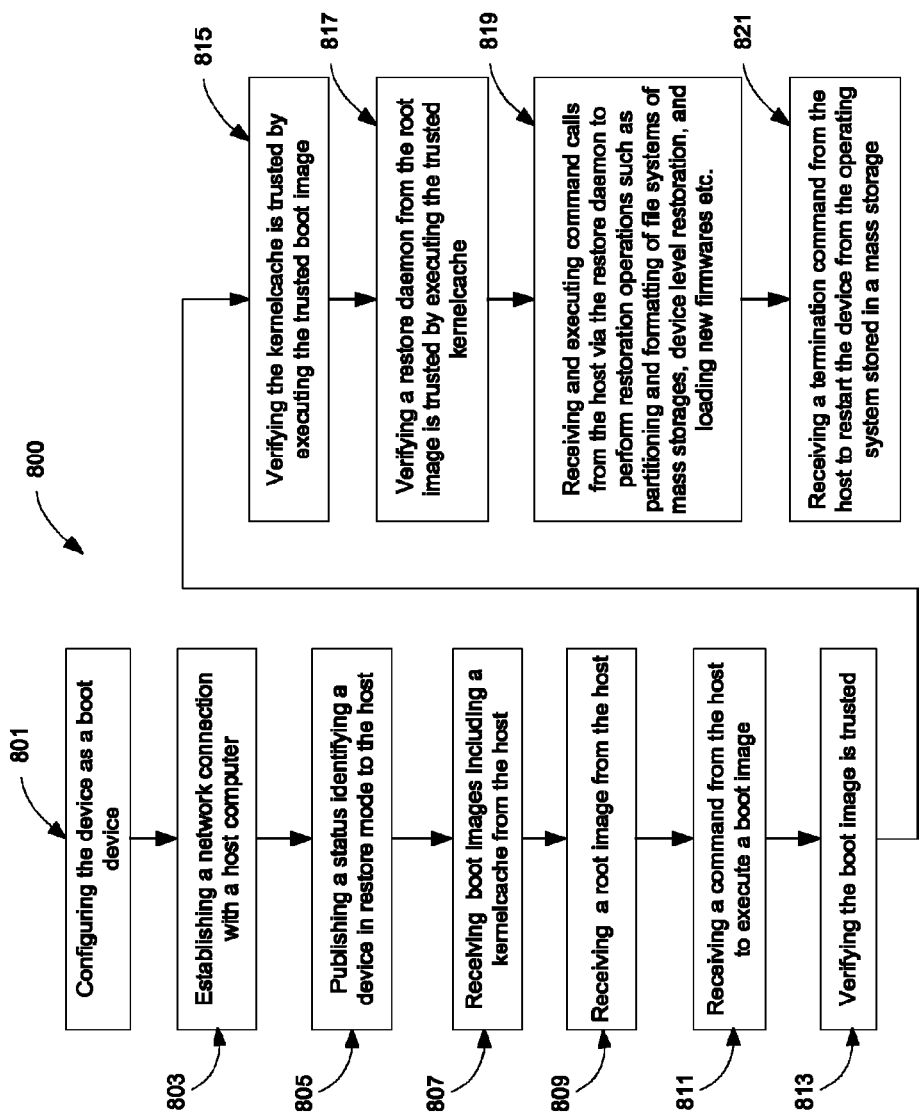
FIG. 8 is a flow diagram illustrating one embodiment of a process to securely restore software components from a host to a device.

FIG. 8 is a flow diagram illustrating one embodiment of a process to securely restore software components from a host to a device. For example, process 800 may be performed by systems as shown in FIGS. 1 and/or 5. In one embodiment, the processing logic of process 800 may configure the device as a boot device at block 801. A boot device may be in a DFU mode. A user may press a button of a device during a normal booting of the device to configure the boot device into DFU mode. The processing logic of process 800 may be activated intentionally by a device user to repair damaged application software, to update old application software, to install a firmware component or to manage existing user data stored in the device. At block 803, according to one embodiment, the processing logic of process 800 may establish a network connection with a host computer. The device and the host computer may be connected through a network interface such as shown in FIG. 5. A restore software, such as iTune from Apple Computer Inc., may be running on the host computer to communicate with the device. The processing logic of process 800 may publish a status to the host computer to identify the device as in a restore mode via the network connection at block 805. A device in a restore mode may also be in a DFU mode. In one embodiment, the status may include information such as device ID and/or product ID. The status may include an indication of required code images from the host computer.

At block 807, according to one embodiment, the processing logic of process 800 may receive boot images from the connected host computer. The boot images may include a boot loader such as LLB 229 or iBoot 231 as shown in FIG. 2. In one embodiment, the boot images may include a kernel cache such as Kernelcache 233 in FIG. 2. A boot image may be received based on the status published to the host computer at block 805. In one embodiment, the boot images may be loaded into a memory component of the device such as memory 103 of FIG. 1. The processing logic of process 800 may receive a root image from the connected host computer at block 809. A root image may be a RAM disk based on a stripped down version of operating system for the device. In one embodiment, the root image may include a restore application.

At block 811, according to one embodiment, the processing logic of process 800 may receive a command from the connected host computer to execute a received boot image. The boot image may be a boot loader. In response, the processing logic of process 800 may verify the boot image is trusted at block 813. In one embodiment, the processing logic of process 800 may perform a process such as shown in FIG. 6 to determine whether the boot image could be trusted based on a secure ROM chip such as chip 105 in FIG. 1. In one embodiment, the processing logic of process 800 may verify a Kernelcache received from the connected host computer is trusted by executing a trusted boot image at block 815. The processing logic of process 800 may perform a process such as shown in FIG. 6 to determine whether the Kernelcache could be trusted based on a root certificate fingerprint stored in the device such as Fingerprints 123 in FIG. 1. At block 817, the processing logic of process 800 may verify a restore daemon application from the root image is trusted by executing the trusted Kernelcache. In on embodiment, the processing logic of process 800 may determine the restore daemon application could be trusted by verifying the root image is a trusted code image. The processing logic of process 800 may perform a process such as shown in FIG. 6 to determine whether the restore daemon application included in the root image could be trusted.

At block 819, according to one embodiment, the processing logic of process 800 may receive and execute commands calls from the host computer via the restore daemon application to perform software restoration operations. In one embodiment, software restoration operations may include the partitioning and formatting of file systems of mass storage, device level restoration or loading new firmware into the device. The processing logic may start the OS included in the root image to launch the restore daemon in the device. In one embodiment, only the reduced portion or minimal portion of the OS is started. This daemon application may communicate with the restore software running in the connected host computer based on an XML (Extensible Markup Language) protocol. In one embodiment, the restore daemon may allow the restore software running on the host computer to issue arbitrary commands to be executed by the device. The commands may include executing auxiliary tools included in the RAM disk and/or making library calls. In one embodiment, the commands may cause replacing the entire set of software stored in the mass storage and the programmable ROM of the device. At block 821, the processing logic of process 800 may receive a command from the connected host computer to restart the device. In response, the processing logic of process 800 may reset the device. Subsequently, the device may reboot from the operating system stored in the mass storage of the device.

Figure 9:
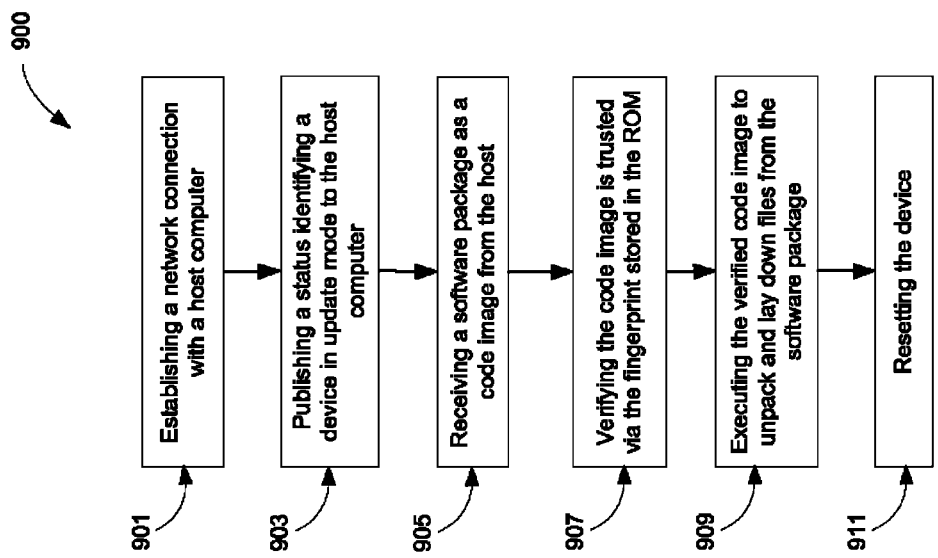
FIG. 9 is a flow diagram illustrating one embodiment of a process to securely update an application from a host to a device.

FIG. 9 is a flow diagram illustrating one embodiment of a process to securely update an application from a host to a device. For example, process 900 may be performed by systems as shown in FIGS. 1 and/or 5. The processing logic of process 900 may establish a network connection with a host computer at block 901. The device and the host computer may be connected through a network interface such as shown in FIG. 5. Update software, such as iTune from Apple Computer Inc., may be running on the host computer to communicate with the device. The processing logic of process 800 may publish a status to the host computer to identify the device as in an update mode via the network connection at block 803. A device in an update mode may also be in a DFU mode. In one embodiment, the status may include information such as device ID and/or product ID. The status may include an indication of a version ID of an application currently residing in the device.

At block 905, according to one embodiment, the processing logic of process 900 may receive a code images from the connected host computer. The code image may include a software package related to an updated version of an application based on the version ID from the published status received by the host computer at block 903. In one embodiment, the code image may be loaded into a memory component of the device such as memory 103 as shown in FIG. 1. At block 907, according to one embodiment, the processing logic of process 900 may verify the code image is trusted. The processing logic of process 900 may perform a process such as shown in FIG. 6 to determine whether the code image could be trusted based on a fingerprint of a root certificate in a secure ROM chip such as Fingerprints 123 in chip 105 shown in FIG. 1. In one embodiment, the processing logic of process 900 may execute the verified code image to unpack files from the included software package and lay down those files inside the file system of the device at block 909. A file from the software package may be a new file or an updated version of an existing file for the device. The processing logic of process 900 may perform an integrity check against a file from the software package to ensure the file is not compromised or corrupted before laying down the file into the file system of the device. In one embodiment, the integrity of a file may be checked based on a signature according to a hash on the file content. At block 911, the processing logic of process 900 may reset the device to reboot from the operating system stored inside the device.

Figure 10:
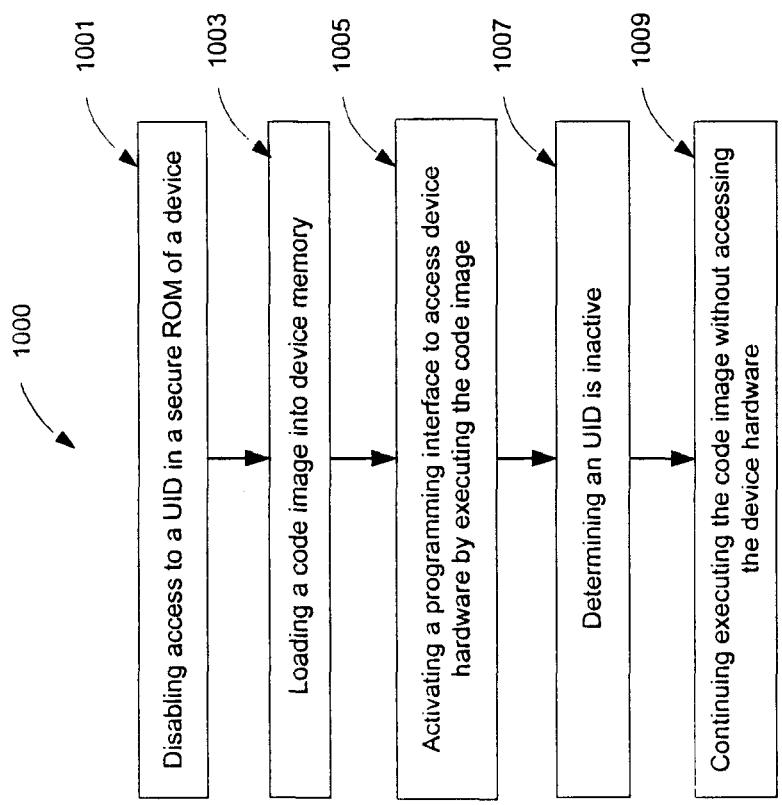
FIG. 10 is a flow diagram illustrating one embodiment of a process for executing unverified code image.

FIG. 10 is a flow diagram illustrating one embodiment of a process of executing unverified code image. For example, process 1000 may be performed by a system as shown in FIG. 1. At block 1001, the processing logic of process 1000 may disable accessing to a UID of a secure ROM in a device such as UID 119 in FIG. 1. In one embodiment, a trusted code image may be configured to turn off accessing to the UID when executed. In another embodiment, a hardware switch of the device may include settings that turn off accessing to the UID. The access configuration of the UID may be specified according to a diagnostic or testing requirement of the device. The trusted code image may be a boot image verified by codes inside a secure ROM of a device such as codes 115 in FIG. 1. In one embodiment, the verification may be performed in a similar process as shown in FIG. 6. The boot image may be LLB 225 or iBoot 227 as shown in FIG. 2. At block 1003, the processing logic of process 1000 may load a code image into a memory component of the device such as RAM 111 of FIG. 1. In one embodiment, the processing logic of process 1000 may load the code image based on a configuration of a trusted code image currently being executed. The code image may be loaded from an external network connection or a mass storage coupled to the device. In one embodiment, the code image may include diagnostic software for the device.

At block 1005, the processing logic of process 1000 may activate a programming interface to access device hardware by executing the code image. Device hardware may be accessed by reading or setting values of device hardware parameters. The processing logic may derive a hash value from the loaded code image to determine if the code image is not compromised (e.g., not corrupted). The determination may be based on a comparison between the derived hash value and a header value from the code image. In one embodiment, the processing logic of process 1000 may determine a UID is inactive at block 1007. The programming interface to access device hardware may cause an execution of codes inside a secure ROM such as codes 115 in FIG. 1 for determining whether the UID is active or not. At block 1009, the processing logic of process 1000 continues executing the code image without accessing the device hardware. In one embodiment, accessing to the device hardware may be controlled by the codes inside a secure ROM of a device based on whether the associated UID is active or not. In another embodiment, user data may not be accessible when a UID is not active. Even when an unverified application is loaded and executed in a device, no device hardware or user sensitive data may be compromised if the UID is not active.

Figure 11:
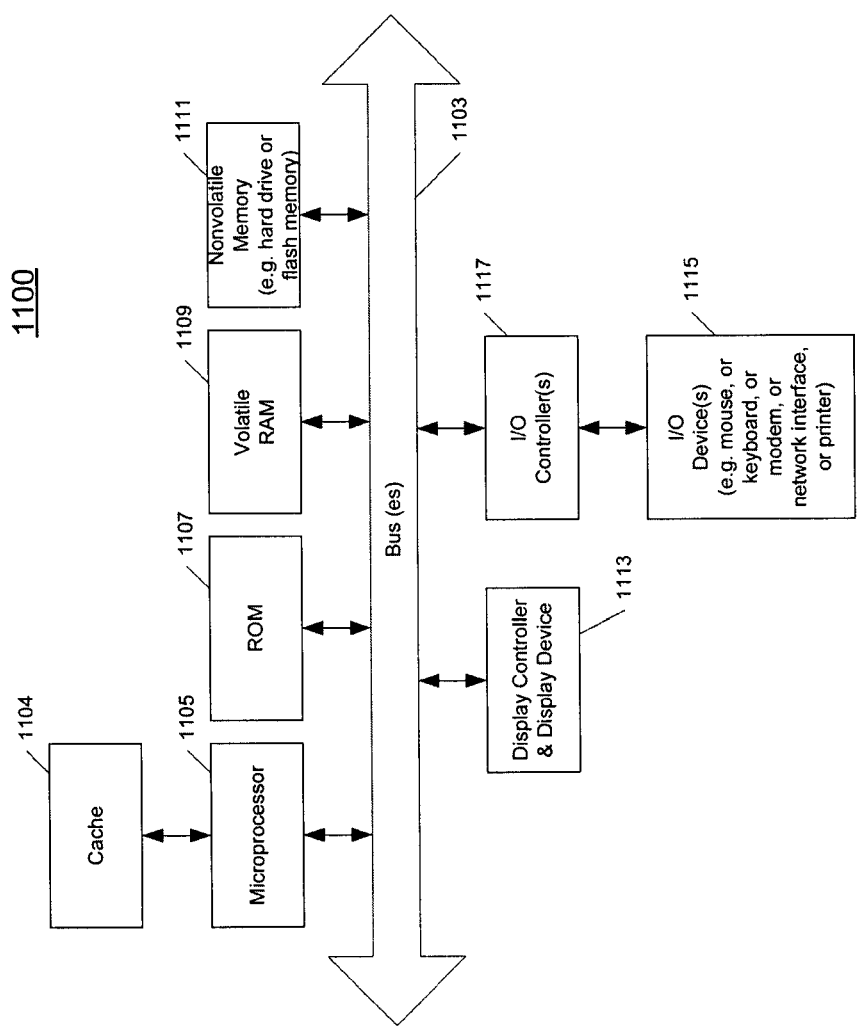
FIG. 11 illustrates one example of a typical computer system which may be used in conjunction with the embodiments described herein.

FIG. 11 shows one example of a data processing system which may be used with one embodiment the present invention. For example, the system 1100 may be implemented including a host as shown in FIG. 5. Note that while FIG. 11 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 11, the computer system 1100, which is a form of a data processing system, includes a bus 1103 which is coupled to a microprocessor(s) 1105 and a ROM (Read Only Memory) 1107 and volatile RAM 1109 and a non-volatile memory 1111. The microprocessor 1105 may retrieve the instructions from the memories 1107, 1109, 1111 and execute the instructions to perform operations described above. The bus 1103 interconnects these various components together and also interconnects these components 1105, 1107, 1109, and 1111 to a display controller and display device 1113 and to peripheral devices such as input/output (I/O) devices which may be mice, keyboards, modems, network interfaces, printers and other devices which are well known in the art. Typically, the input/output devices 1115 are coupled to the system through input/output controllers 1117. The volatile RAM (Random Access Memory) 1109 is typically implemented as dynamic RAM (DRAM) which requires power continually in order to refresh or maintain the data in the memory.

The mass storage 1111 is typically a magnetic hard drive or a magnetic optical drive or an optical drive or a DVD RAM or a flash memory or other types of memory systems which maintain data (e.g. large amounts of data) even after power is removed from the system. Typically, the mass storage 1111 will also be a random access memory although this is not required. While FIG. 11 shows that the mass storage 1111 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1103 may include one or more buses connected to each other through various bridges, controllers and/or adapters as is well known in the art.

Figure 12:
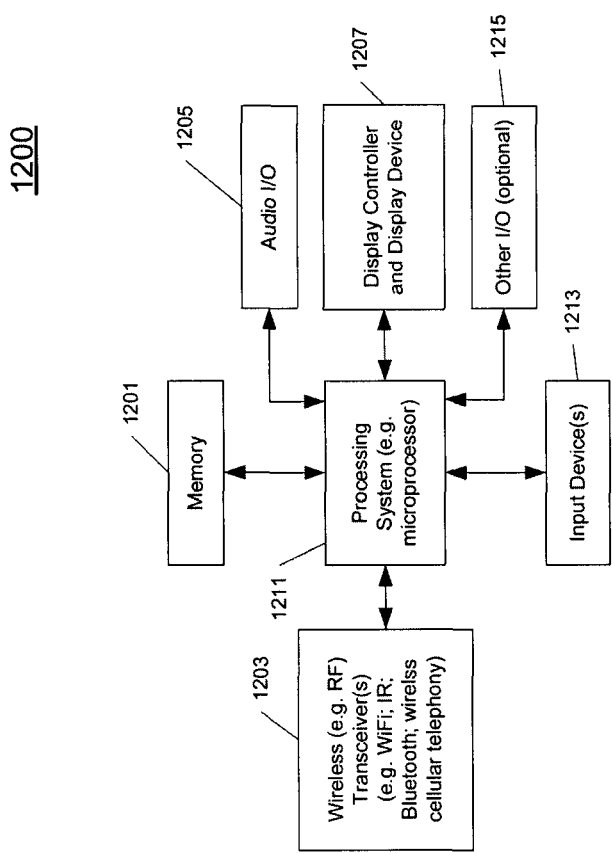
FIG. 12 shows an example of a data processing system which may be used with one embodiment of the present invention

FIG. 12 shows an example of another data processing system which may be used with one embodiment of the present invention. For example, system 1200 may be implemented as part of system as shown in FIG. 1. The data processing system 1200 shown in FIG. 12 includes a processing system 1211, which may be one or more microprocessors, or which may be a system on a chip integrated circuit, and the system also includes memory 1201 for storing data and programs for execution by the processing system. The system 1200 also includes an audio input/output subsystem 1205 which may include a microphone and a speaker for, for example, playing back music or providing telephone functionality through the speaker and microphone.

A display controller and display device 1207 provide a visual user interface for the user; this digital interface may include a graphical user interface which is similar to that shown on a Macintosh computer when running OS X operating system software. The system 1200 also includes one or more wireless transceivers 1203 to communicate with another data processing system, such as the system 1100 of FIG. 11. A wireless transceiver may be a WiFi transceiver, an infrared transceiver, a Bluetooth transceiver, and/or a wireless cellular telephony transceiver. It will be appreciated that additional components, not shown, may also be part of the system 1200 in certain embodiments, and in certain embodiments fewer components than shown in FIG. 12 may also be used in a data processing system.

The data processing system 1200 also includes one or more input devices 1213 which are provided to allow a user to provide input to the system. These input devices may be a keypad or a keyboard or a touch panel or a multi touch panel. The data processing system 1200 also includes an optional input/output device 1215 which may be a connector for a dock. It will be appreciated that one or more buses, not shown, may be used to interconnect the various components as is well known in the art. The data processing system shown in FIG. 12 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 1200 may be a network computer or an embedded processing device within another device, or other types of data processing systems which have fewer components or perhaps more components than that shown in FIG. 12.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. patent application numbers 2003/0095096 and 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computer implemented method, comprising:
executing computer program codes embedded in a secure ROM (read-only memory) of a portable device to verify a first executable code image representing a kernel of an operating system (OS) that provides an operating environment of the portable device, the first executable image being verified by:
extracting a first signature value signed over the first executable image according to a key through hashing and encryption algorithms, the key stored within the secure ROM and uniquely identifying the portable device,
determining a second signature value based on the first executable image according to the key through the hashing and encryption algorithms,
comparing the first signature value to the second signature value, and
determining that the first executable image is successfully verified when the first signature value matches the second signature value,
wherein the first executable image is stored in a mass storage of the portable device; and
upon successfully verifying the first code image, executing the first executable image in a main memory of the portable device to set up the kernel of the OS in order to establish the operating environment of the portable device.

2. The method of claim 1, further comprising upon successfully executing the first executable image, the kernel configuring and loading a second executable image from the mass storage to establish a remainder of the OS, the second executable image representing at least one of user applications, user data, and libraries.

3. The method of claim 2, wherein the embedded codes and the key are embedded in the secure ROM prior to releasing the portable device from a manufacturer, and wherein the first executable image is digitally signed by data representing the key.

4. A machine-readable medium having instructions stored therein, which when executed by a machine, cause a machine to perform a method, the method comprising:
executing computer program codes embedded in a secure ROM (read-only memory) of a portable device to verify a first executable code image representing a digital rights management system that controls access to user data of operating system (OS) components, wherein the operating system provides an operating environment of the portable device, the first executable image being verified by:
extracting a first signature value signed over the first executable image according to a key through hashing and encryption algorithms, the key stored within the secure ROM and uniquely identifying the portable device, wherein the first executable image is stored in a mass storage of the portable device,
determining a second signature value based on the first executable image according to the key through the hashing and encryption algorithms,
comparing the first signature value to the second signature value, and
determining that the first executable image is successfully verified when the first signature value matches the second signature value; and
upon successfully verifying the first code image, executing the first executable image in a main memory of the portable device to control access to user data of the operating system components based upon the key.

5. The machine-readable medium of claim 4, wherein the method further comprises enabling the digital rights management system to access the key upon successfully verifying the first code image.

6. The machine-readable medium of claim 4, wherein the embedded codes and the key are embedded in the secure ROM prior to releasing the portable device from a manufacturer, and wherein the first executable image is digitally signed by data representing the key.

7. A computer implemented method, comprising:
executing a first executable code image embedded in a secure ROM (read-only memory) of a device to initialize a mass storage device associated with the device to enable the mass storage device to be accessed, the secure ROM having stored therein a unique identifier (ID) uniquely identifying the device;
upon successfully initializing the mass storage device, locating and verifying a second executable image stored within the mass storage device using the unique identifier (ID) embedded within the secure ROM, the second executable image being verified by:
extracting a first signature value signed over the second executable image according to the unique identifier through hashing and encryption algorithms,
determining a second signature value based on the second executable image according to the unique identifier through the hashing and encryption algorithms,
comparing the first signature value to the second signature value, and
determining that the second executable image is successfully verified when the first signature value matches the second signature value;
upon successfully verifying the second executable image, executing the second executable image to perform low level hardware initialization on the device, wherein, when the second executable image is successfully executed, a third executable image is located and executed, and is configured to verify and load a kernel image of an operating system (OS) for the device, wherein the kernel image, when successfully loaded, initializes and configures a remainder of the OS for the device.

8. The method of claim 7, wherein when verification of any of the first, second, and third executable images fails, the method further comprises performing a recovery process to recover the respective executable image immediately without continuing executing a subsequent executable image.

9. The method of claim 7, wherein the device is a portable device.

* * * * *